Feb. 22, 1944.    V. L. OESTNAES    2,342,363
BUOY MARKER
Filed June 11, 1940
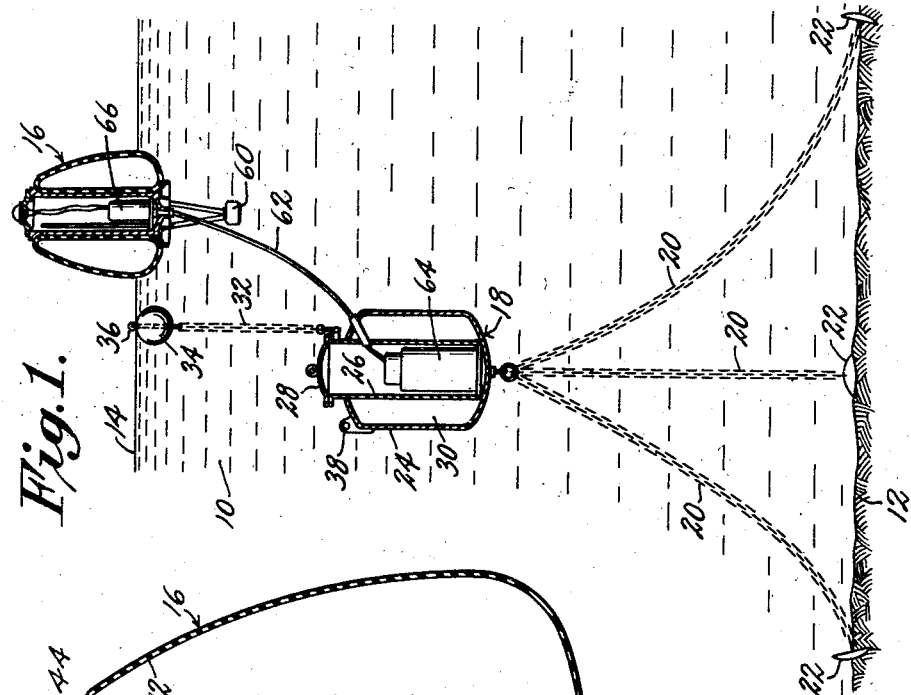
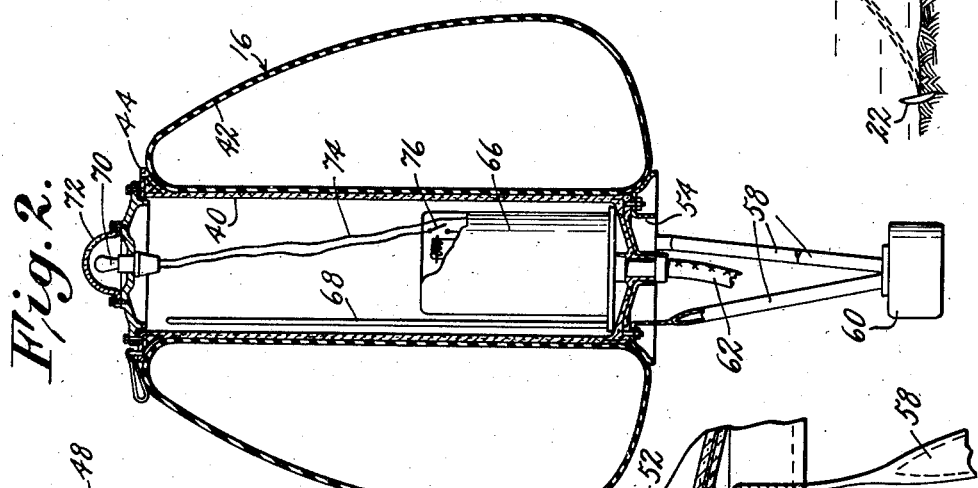
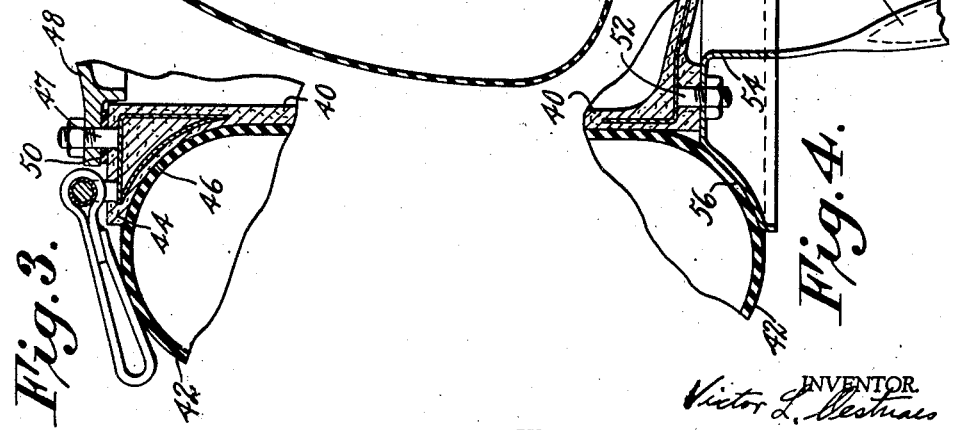
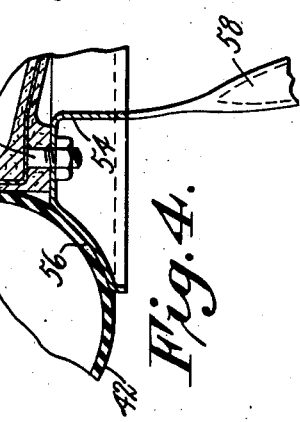
INVENTOR.
Victor L. Oestnaes
BY
James C. Markle
his ATTORNEY Patented Feb. 22, 1944

2,342,363

UNITED STATES PATENT OFFICE 2,342,363

BUOY MARKER

Victor L. Oestnaes, Elizabeth, N. J., assignor to American Gas Accumulator Company, Elizabeth, N. J., a corporation of New Jersey Application June 11, 1940, Serial No. 339,849

3 Claims. (Cl. 9—8.3)

The present invention relates to buoy markers and has particular reference to buoy markers for marine aircraft landing areas.

The problem in marking marine landing areas for aircraft is rendered difficult by the requirement that any floating marker must be relatively light in order that a collision with a marker shall not damage the relatively frail pontoons of a seaplane or the relatively frail hull of a flying boat. This requirement not only calls for resilient or yielding characteristics in the float itself, but also requires that the weight of the float be kept to a minimum to reduce as far as possible the inertia forces developed by a collision between marker and aircraft. On the other hand, to effectively mark landing areas at night requires that a light source be provided on each marker which in turn calls for a source of energy. A further requirement is that the marker be anchored relatively stationary in order to accurately mark the landing area or runway. Further, due to the relatively large areas which must be marked, there may be very considerable variations in the depth of water at the various mooring places. With variations in depth the weights of the moorings vary and where the depth is great this weight becomes so considerable as to require a relatively large and consequently heavy float to support them. Also, if the source of energy for the light source carried by the marker is to be adequate over considerable periods of time without renewal, the weight of such source, which requires support, must be considerable.

The general object of the present invention is to provide new and improved marking apparatus which will meet all the requirements for properly marking a marine landing area in darkness as well as in daylight and which will accomplish this by means insuring against damage to aircraft landing in the area in the event of accidental collision with one or more of the markers. To this end the invention contemplates the provision of marker units, each consisting of a light weight marker buoy of yielding character adapted to float on the surface and advantageously carrying a light source for night marking, attached to a moored auxiliary buoy held in submerged position by its moorings and carrying a source of energy for energizing the light source in the marker buoy.

Preferably, in accordance with the principles of the invention, the auxiliary buoy is moored at a submerged depth only sufficient to insure against its being contacted by any aircraft passing over it on the surface of the water at a time when the water is at the lowest level encountered in the area where the buoy is moored, thus making the length and weight of cable, chain or other connecting means between the auxiliary buoy and the marker buoy a minimum and thereby contributing to reduction in the displacement and weight required for a marker buoy required to support its share of the weight of the connection between marker and auxiliary buoys.

Further, within the scope of the invention, the marker unit is advantageously equipped with suitable remote control whereby any source of light contained therein may be turned off or on without the necessity for the provision of any physical connection between the moored unit and the shore.

For a better understanding of both the general and more detailed objects of the invention, which will hereinafter appear, and the manner in which the invention may advantageously be carried into effect, reference may best be had to the ensuing portion of this specification taken in conjunction with the accompanying drawings, which describe and illustrate by way of example but without limitation, one suitable form of construction adapted to carry the invention into effect.

In the drawing:

Fig. 1 is a more or less diagrammatic vertical elevation, partly in section, showing a marker unit moored in operative position and embodying the principles of the invention;

Fig. 2 is a section on larger scale of the marker buoy shown in Fig. 1; and

Figs. 3 and 4 are fragmentary sections showing details on a still larger scale of the marker buoy shown in Fig. 2.

Referring now to the drawing, 10 indicates a body of water the bottom of which is at 12 and the surface of which is at 14.

Numeral 16 indicates generally a marker buoy and 18 indicates generally its associated auxiliary buoy. The auxiliary buoy 18 is moored to the bottom 12 by mooring chains 20 attached to suitable anchors 22. The specific construction of the mooring lines and anchoring means is not material to the invention.

The auxiliary buoy 18, in the embodiment illustrated, consists of an outer shell 24 through which there extends an inner shell 26 having a removable cover plate 28 secured thereto and packed by any suitable water-tight joint. Between the outer and inner shells there is formed the annular buoyancy chamber 30, the buoyancy of which serves not only to support the weight of the auxiliary buoy itself and its contents, but also the weight of the mooring lines.

The auxiliary buoy advantageously is provided with a lifting line 32 which may be a chain or cable and which is supported by a relatively very small and light float 34 which is advantageously held just below the surface by the length of the lifting line and which provides a ring 36 or like device just at the surface by means of which the auxiliary buoy may be brought to the surface for inspection or for renewal of the energy source carried by it. In case it is desired to remove the device entirely from the water, in which event the support of the water due to its buoyancy is lost, lifting means such as the eye 30 on the main casing is advantageously provided.

The form of marker buoy illustrated consists of a central cylindrical hollow core 40 of rigid material, preferably non-metallic, surrounded by an annular inflated bag 42 of flexible waterproof material such as rubber or rubber impregnated fabric. At its upper end the core 40 is flared as seen in Fig. 3 to provide a flange 44 having a curved surface 46 against which the top of the bag bears to prevent axial displacement of the bag relative to the core. The upper end of the core has secured thereto a series of studs 47 for the retention of a removable cover plate 48 which seats against any suitable form of gasket 50 for preventing leakage of water into the interior of the core. At its lower end the core is provided with a series of studs 52 which serve to removably support a bottom ring member 54 having an outer portion providing a curved surface 56 forming a seat against which the bottom portion of the envelope 42 rests and is also preferably secured against axial displacement, as by cementing or other equivalent means. The ring member 54 also has secured thereto the upper ends of a number of arms 58 which in turn support a small counterweight 60 which serves to insure the upright floating position of the marker.

The marker buoy 16 is secured to the auxiliary buoy 18 by means of a connecting line 62 which serves to keep the two buoys in desired attached relation, but which advantageously may also include means for transmitting energy between the two. This connection may be of any suitable form of flexible waterproof cable and if the source of light in the marker buoy is gas energized, may incorporate a flexible tube for conducting gas from the source in the auxiliary buoy to the light in the marker buoy.

The source of energy is indicated generally at 64 and may be a storage battery, gas bottle or the like, depending upon the nature of the source of light.

For the control of the light, radio control apparatus of any suitable known form may be employed and the receiving portion of such apparatus is indicated diagrammatically at 66, the antenna therefor being indicated at 68. In case such apparatus is employed, the receiving apparatus is advantageously carried in the marker buoy in order to keep it away from the compartment of the auxiliary buoy which requires to be opened at intervals in order to replace depleted sources of energy with fresh units. Since energy is supplied to the marker buoy from the auxiliary buoy, the receiving apparatus does not necessarily require batteries or like sources of energy to be incorporated in it and consequently may be of relatively light weight.

When remote control of the light source is effected by means of radio receiving apparatus carried by the marker buoy, it is apparent that the rigid portion 40 of the marker should be nonmetallic in nature, in order not to mask the antenna of the radio apparatus.

In the embodiment illustrated, an electrically energized light is employed, the light being shown at 70, operating in conjunction with the lens 72. Obviously within the scope of the invention the light may be of any desired specific character and the lens may be of any form adapted to diffuse the light or concentrate it into a beam, as may be desired in any specific instance.

The source of energy at 64 is in this instance a battery of suitable form and energy for the light as well as that for energizing the receiving apparatus 66 is transmitted through the connection 62. Control of the light 70 through the medium of the receiving apparatus may be effected in any desired known manner. For purposes of illustration the light 70 is shown as being energized through the feed wire 74 adapted to be alternatively connected to or disconnected from the source of energy by means of a switching means indicated diagrammatically at 76, the latter being actuated in any suitable manner by the receiving apparatus. It will be apparent that in the case of a gas operated light, the connecting line 62 may carry a small gas supply tube leading from a storage bottle or generator in the auxiliary buoy and control of gas flow effected through the medium of a suitable valve controlled by the receiving apparatus instead of by the switch 76 shown in the illustrated embodiment.

By reference to Fig. 1 it will be observed that regardless of the depth of water at which the marker is placed, the auxiliary buoy 18 can be constructed with sufficient buoyancy to support the mooring lines reaching to the bottom. Since the auxiliary buoy is moored relatively near to the surface, usually a matter of only a few feet, and since its buoyance can readily be made such as to support a number of mooring lines, it can readily be made to provide a very closely fixed datum point close to the surface. This enables a relatively very short connection 62 to be employed, the weight of which is comparatively little and which may be constant for all of the marker units of the system regardless of the depth of water at which the different units are placed. Consequently, the marker buoys may all be alike and of relatively small and lightweight construction since substantially the only weight which must be upheld by them is their own weight. Also, due to the relatively very short connection between the auxiliary buoy and the marker buoy, the lateral movement of the latter on the surface of the water is fixed within a relatively small area, to provide accurate marking for the landing area. It will be understood of course that where the marker units are placed in tidal waters the connection or connections between auxiliary and marker buoys will be of sufficient length to permit the marker buoys to float at all water levels. Also, in tidal waters, the lifting line 32 is preferably given sufficient length to permit the float 34 to rise and fall at about surface level in accordance with the changes in water level.

It will further be understood that in instances where the landing or runway area to be marked embodies water of varying depth, the invention contemplates a system of marker units in which the variations in depth of water are taken care of by mooring means of varying length for mooring the several auxiliary buoys of the system at approximately the same depth of submergence.

While one form of apparatus embodying the invention has been shown by way of example, it will be evident that many variations in the specific form of the means for carrying the invention into effect may be employed within the spirit and scope of the invention as defined in the appended claims.

What is claimed:

1. A marine marker unit comprising a relatively light weight buoyant marker buoy constructed to float on the surface of a body of water, a source of light carried by said marker buoy, a buoyant auxiliary buoy, a source of energy for said light carried by said auxiliary buoy, means for mooring said auxiliary buoy in submerged position at a fixed height above the bottom and a short distance below the low water level of said body of water, and flexible means for mooring the marker buoy to the auxiliary buoy and for transmitting energy from said source of energy to said light, the effective length of said flexible means being limited to substantially the length required to permit said marker buoy to float on the surface at the high water level of said body of water.

2. A marine marker unit comprising a relatively light weight buoyant marker buoy including an inflatable and yieldable body constructed to float on the surface of a body of water, a source of light carried by said marker buoy, a buoyant auxiliary buoy, a source of energy for said light carried by said auxiliary buoy, means for mooring said auxiliary buoy in submerged position at a fixed height above the bottom and a short distance below the low water level of said body of water, and flexible means for mooring the marker buoy to the auxiliary buoy and for transmitting energy from said source of energy to said light, the effective length of said flexible means being limited to substantially the length required to permit said marker buoy to float on the surface at the high water level of said body of water.

3. A marine marker unit comprising a relatively light weight buoyant marker buoy, constructed to float on the surface of a body of water, a source of light carried by said marker buoy, a buoyant auxiliary buoy, a source of energy for said light carried by said auxiliary buoy, means for mooring said auxiliary buoy in submerged position at a fixed height above the bottom and a short distance below the low water level of said body of water, flexible means for mooring the marker buoy to the auxiliary buoy and for transmitting energy from said source of energy to said light, the effective length of said flexible means being limited to substantially the length required to permit said marker buoy to float on the surface at the high water level of said body of water, and radio receiving apparatus carried by said unit and responsive through remote control for selectively controlling the supply of energy to said light source.

VICTOR L. OESTNAES.